United States Patent [19]
Fujii et al.

[11] Patent Number: 6,124,884
[45] Date of Patent: Sep. 26, 2000

[54] APPARATUS FOR AND METHOD OF MEASURING IMAGE QUALITIES OF COLOR DISPLAY UNIT

[75] Inventors: Masaru Fujii, Kanagawa; Satoshi Takemoto, Tokyo; Tokio Takeuchi, Chiba, all of Japan

[73] Assignee: Sony Corporation, Tokyo, Japan

[21] Appl. No.: 08/859,267

[22] Filed: May 20, 1997

[30] Foreign Application Priority Data

May 23, 1996 [JP] Japan ..................................... 8-128588

[51] Int. Cl.[7] ...................................................... H04N 9/47
[52] U.S. Cl. ............................................... 348/93; 348/135
[58] Field of Search .................................. 348/93, 61, 86, 348/92, 125, 129, 130, 135, 136, 137, 143, 94, 95; H04N 9/47

[56] References Cited

U.S. PATENT DOCUMENTS 5,058,174 10/1991 Carroll ....................................... 348/93
5,420,628 5/1995 Poulsen et al. ......................... 348/135

*Primary Examiner*—Young Lee
*Attorney, Agent, or Firm*—Frommer Lawrence & Haug, LLP.; William S. Frommer; Glenn F. Savit

[57] ABSTRACT

An apparatus for measuring image qualities of a color display unit includes a color video camera for imaging a display screen of a first color display unit, a central processing unit for measuring image qualities of the display screen of the first color display unit based on an image signal generated by the color video camera, a second color display unit for displaying data of the image qualities measured by the computer, and an image signal generator controllable by the central processing unit for generating an image signal required to measure the image qualities and supplying the image signal to the first color display unit. The central processing unit supplies the image signal generated by the color video camera to the second color display unit to display an image of the display screen of the first color display unit in a predetermined display area on a display screen of the second color display unit for relative positional adjustment between the first color display unit and the color video camera.

14 Claims, 5 Drawing Sheets

APPARATUS FOR AND METHOD OF MEASURING IMAGE QUALITIES OF COLOR DISPLAY UNIT

BACKGROUND OF THE INVENTION

1. Field of the Invention

The present invention relates to an apparatus for and a method of measuring the image qualities of a color display unit such as a color television receiver, a television color cathode-ray tube, a display monitor (a color cathode-ray tube as a computer display monitor), a projection display unit, or the like.

2. Description of the Prior Art

One conventional apparatus for measuring the image qualities of a color display unit will be described below with reference to FIG. 1 of the accompanying drawings. In FIG. 1, the color display unit, denoted by 1, whose image qualities are to be measured by the apparatus comprises a color television receiver which has a color cathode-ray tube. However, the color display unit 1 may comprise a television color cathode-ray tube, a display monitor (a color cathode-ray tube as a computer display monitor), a projection display unit, or the like.

The apparatus has a color video camera 2 for imaging images in their entirety which are displayed on the color display unit 1 and a fixed-focus lens 2L used as an imaging lens of the color video camera 2. The color video camera 2 and the fixed-focus lens 2L jointly serve as an image quality sensor (color image quality sensor).

A video monitor 7V, which comprises a television color cathode-ray tube, is supplied with an image signal from the color video camera 2, and displays on its display screen an image of the display screen of the color television receiver as the color display unit 1.

An image processing circuit 5 has an A/D converter 5A for converting an image signal from the color video camera 2 into a digital image signal, and a frame memory 5B for storing the digital image signal from the A/D converter 5A. If a digital image signal is directly generated by the color video camera 2, then the A/D converter 5A of the image processing circuit 5 may be dispensed with. The digital image signal (digital image data) read from the frame memory 5B is transferred through a bus line (two thin wires) to a memory (not shown) in a CPU (central processing unit) as a computer, the CPU having a ROM which stores a program and a RAM for storing processed data.

A monitor 7, which comprises a color cathode-ray tube for use as a computer display monitor, is connected to the CPU 6.

The CPU 6 controls a signal generator 12 through a bus line for generating an image signal such as a pattern signal which is necessary for measurement. The generated image signal is supplied to the color display unit 1 for displaying a pattern image necessary for measurement on the display screen of the color cathode-ray tube.

For example, if image distortions (geometric raster distortions) of an image are to be measured, then the CPU 6 calculates the position of the image from the image data, and displays calculated positional data as graphic data or numerical data on the display screen of the monitor 7 on a real-time basis. The CPU 6 may store the calculated positional data in an external memory such as a hard disk (not shown) or transmit the calculated positional data through a network to a host computer for analytical processing or the like.

An input/output interface circuit 9, which is connected to the CPU 6, is used to control measurement start and end signals that are used in the measurement of image qualities on a display unit production line, or to generate serial control signals that are used in the automatic adjustment of the image qualities of the color display unit 1.

FIG. 2 of the accompanying drawings shows another conventional apparatus for measuring the image qualities of a color display unit. The conventional apparatus shown in FIG. 2 is similar to the conventional apparatus shown in FIG. 1 except that a common monitor 7K is used in place of the monitors 7, 7V shown in FIG. 1.

In the conventional apparatus shown in FIG. 2, the common monitor 7K has a variable scanning frequency. The scanning frequency of the common monitor 7K at the time an image signal from the color video camera 2 is supplied to the common monitor 7K differs from the scanning frequency thereof at the time a display signal based on measured image qualities from the CPU 6 is supplied to the common monitor 7K.

The conventional apparatus shown in FIG. 1 uses two monitors and hence requires more complex hardware than the conventional apparatus shown in FIG. 2.

As described above, the conventional apparatus shown in FIG. 2 uses the common monitor 7K whose scanning frequency at the time an image signal from the color video camera 2 is supplied to the common monitor 7K differs from the scanning frequency thereof at the time a display signal based on measured image qualities from the CPU 6 is supplied to the common monitor 7K. The common monitor 7K with the variable scanning frequency is more expensive than the monitors 7, 7v, and hence the conventional apparatus shown in FIG. 2 is relatively expensive to manufacture.

The conventional apparatus have no means for assisting the operator to determine a field of view of the color video camera 2 when the operator adjusts the position of the color video camera 2 while viewing an image displayed on the display screen of the color display unit 1. Consequently, the operator needs to be experienced enough to establish a field of view of the color video camera 2.

SUMMARY OF THE INVENTION

It is therefore an object of the present invention to provide an apparatus for and a method of measuring the image qualities of a color display unit inexpensively through a relatively simple arrangement, while displaying on a single display monitor an image of the display screen of the color display unit which has been imaged by a color video camera of an image quality sensor for positional adjustment between the color display unit and the color video camera, and an image of data of measured image qualities produced by a computer from an image of the display screen of the color display unit which has been imaged by the color video camera.

Another object of the present invention to provide an apparatus for and a method of measuring the image qualities of a color display unit, while allowing easy, quick, and accurate adjustments with respect to relative positional relationship between the color display unit and a color video camera of an image quality sensor.

According to the present invention, there is provided an apparatus for measuring image qualities of a color display unit, comprising a color video camera for imaging a display screen of a first color display unit, a computer for measuring image qualities of the display screen of the first color display unit based on an image signal generated by the color video camera, a second color display unit for displaying data of the image qualities measured by the computer, and image signal generating means controllable by the computer for generating an image signal required to measure the image qualities and supplying the image signal to the first color display unit, the computer comprising means for supplying the image signal generated by the color video camera to the second color display unit to display an image of the display screen of the first color display unit in a predetermined display area on a display screen of the second color display unit for relative positional adjustment between the first color display unit and the color video camera.

With the above arrangement, the image signal from the color video camera is supplied through the computer to the second color display unit, which displays in the predetermined display area the image of the display screen of the first color display unit for relative positional adjustment between the first color display unit and the color video camera.

Therefore, the apparatus is capable of displaying on the second color display unit the image of the display screen of the first color display unit as imaged by the color display camera for relative positional adjustment between the first color display unit and the color video camera, and also the data of image qualities of the display screen of the first color display unit as measured by the computer based on the image signal from the color video camera.

The second color display unit displays in the predetermined display area on the display screen thereof a reference frame with respect to the image of the display screen of the first color display unit. The reference frame displayed in the predetermined display area on the display screen of the second color display unit allows the operator to position the color video camera with respect to the first color display unit easily, quickly, and accurately.

According to the present invention, there is also provided a method of measuring image qualities of a color display unit, comprising the steps of imaging a display screen of a first color display unit with a color video camera, measuring image qualities of the display screen of the first color display unit with a computer based on an image signal generated by the color video camera, supplying an image signal required to measure the image qualities from an image signal generator controlled by the computer to the first color display unit, supplying an image signal from the color video camera through the computer to a second color display unit to display an image of the display screen of the first color display unit in a predetermined display area on a display screen of the second color display unit for relative positional adjustment between the first color display unit and the color video camera.

Therefore, the method is capable of displaying on the second color display unit the image of the display screen of the first color display unit as imaged by the color display camera for relative positional adjustment between the first color display unit and the color video camera, and also the data of image qualities of the display screen of the first color display unit as measured by the computer based on the image signal from the color video camera.

The method also includes the step of displaying in the predetermined display area on the display screen of the second color display unit a reference frame with respect to the image of the display screen of the first color display unit. The reference frame thus displayed allows the operator to position the color video camera with respect to the first color display unit easily, quickly, and accurately.

DETAILED DESCRIPTION OF THE PREFERRED EMBODIMENTS

Figure 1:
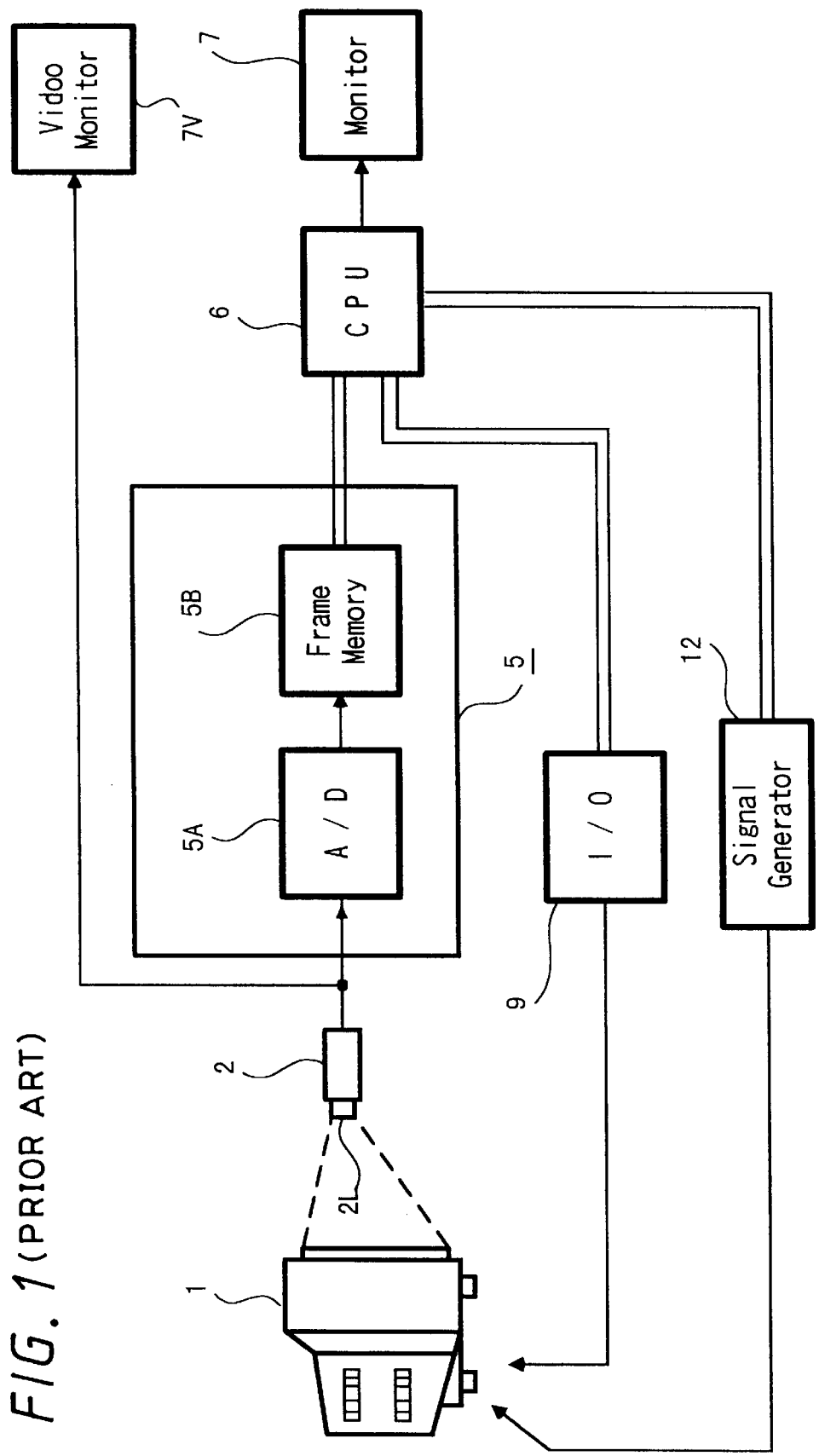
FIG. 1 is a block diagram of a conventional apparatus for measuring the image qualities of a color display unit.
Figure 2:
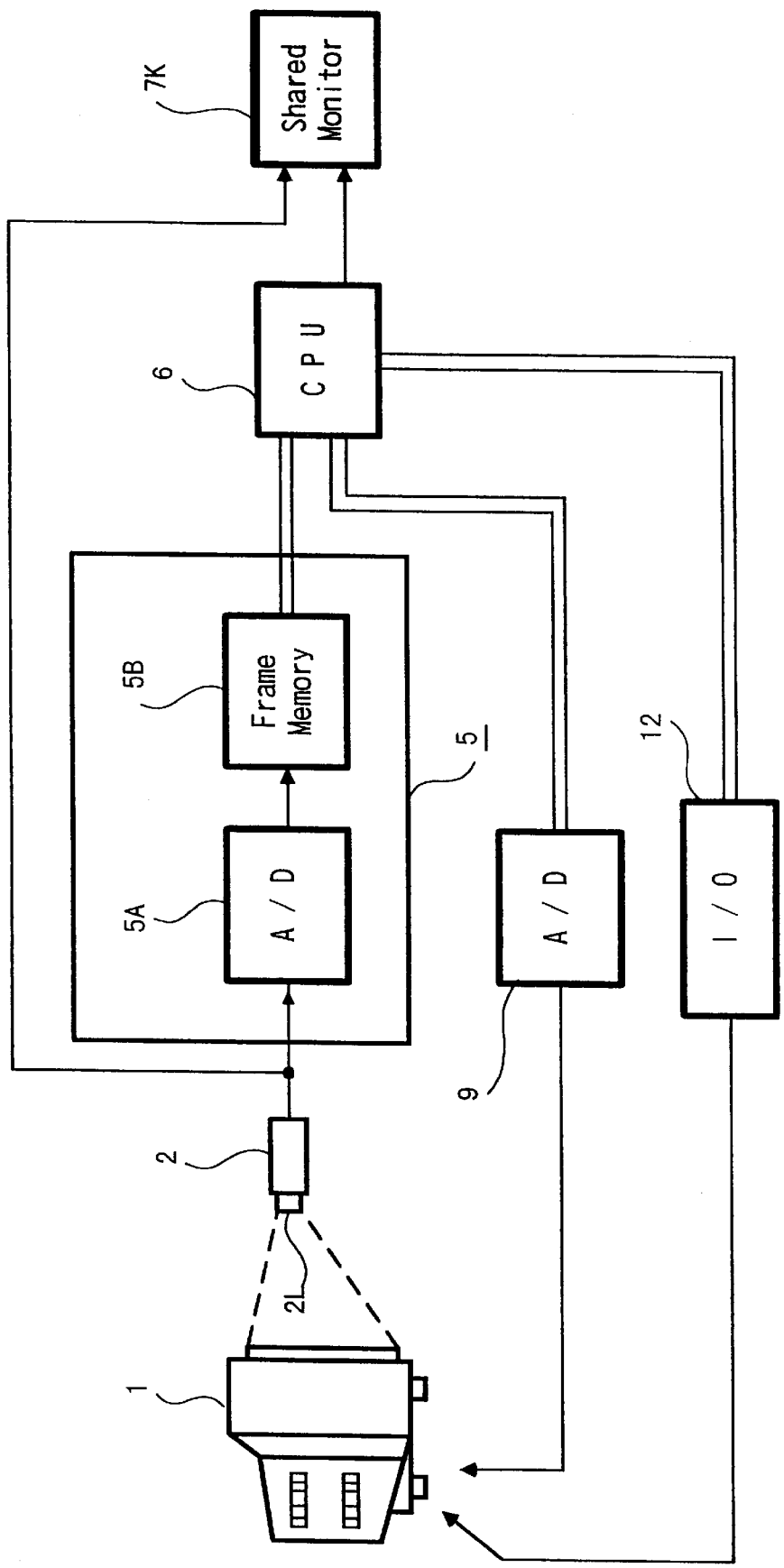
FIG. 2 is a block diagram of another conventional apparatus for measuring the image qualities of a color display unit.
Figure 3:
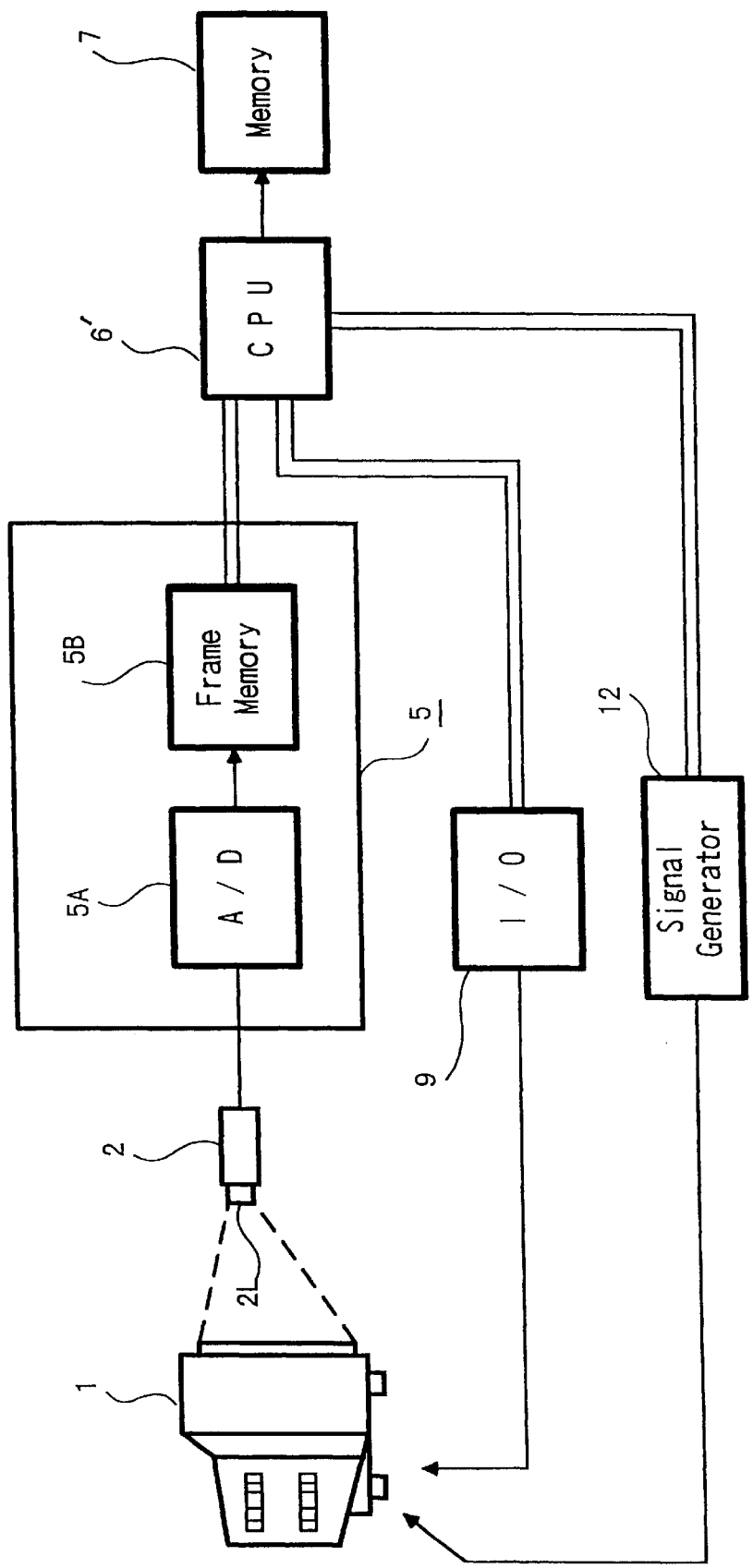
FIG. 3 is a block diagram of an apparatus for measuring the image qualities of a color display unit according to the present invention.

FIG. 3 shows an apparatus for measuring the image qualities of a color display unit according to the present invention. In FIG. 3, the color display unit, denoted by 1, whose image qualities are to be measured by the apparatus comprises a color television receiver which has a color cathode-ray tube. However, the color display unit 1 may comprise a television color cathode-ray tube, a display monitor (a color cathode-ray tube as a computer display monitor), a projection display unit, or the like.

The apparatus has a color video camera 2 for imaging the entire front face of the color display unit 1 and a fixed-focus lens 2L used as an imaging lens of the color video camera 2. The color video camera 2 and the fixed-focus lens 2L jointly serve as an image quality sensor (color image quality sensor).

An image processing circuit 5 has an A/D converter 5A for converting an image signal from the color video camera 2 into a digital image signal, and a frame memory 5B for storing the digital image signal from the A/D converter 5A. If a digital image signal is directly generated by the color video camera 2, then the A/D converter 5A of the image processing circuit 5 may be dispensed with. The digital image signal (digital image data) read from the frame memory 5B is transferred through a bus line (two thin wires) to a memory (not shown) in a CPU (central processing unit) as a computer, the CPU having a ROM which stores a program and a RAM for storing processed data.

A display monitor 7, which comprises a color cathode-ray tube for use as a computer display monitor, is connected to the CPU 6'.

The CPU 6' controls a signal generator 12 through a bus line for generating an image signal such as a pattern signal which is necessary for measurement. The generated image signal is supplied to the color display unit 1 for displaying a pattern image necessary for measurement on the display screen of the color cathode-ray tube.

For example, if image distortions (geometric raster distortions) of an image are to be measured, then the CPU 6' calculates the position of the image from the image data, and displays calculated positional data as graphic data or numerical data on the display screen of the monitor 7 on a real-time basis. The CPU 6' may store the calculated positional data in an external memory such as a hard disk (not shown) or transmit the calculated positional data through a network to a host computer for analytical processing or the like.

An input/output interface circuit 9, which is connected to the CPU 6', is used to control measurement start and end signals that are used in the measurement of image qualities on a display unit production line, or to generate serial control signals that are used in the automatic adjustment of the image qualities of the color display unit 1.

A process of measuring the image qualities of the color display unit 1 and a process of adjusting the image qualities of the color display unit 1 based on the measured image qualities will be described below. The CPU 6' controls the signal generator 12 to display measurement patterns at measurement spots on the display screen of the color display unit 1. Then, the measurement patterns displayed on the display screen of the color display unit 1 are imaged in its entirety by the color video camera 2, and an image signal generated by the color video camera 2 is supplied to the image processing circuit 5. In the image processing circuit 5, the image signal is converted into a digital image signal by the A/D converter 5A. The digital image signal is stored in the frame memory 5B. The CPU 6' processes the digital image data stored in the frame memory 5B to calculate the positions of the respective patterns. The CPU 6' displays the calculated positions on the monitor 7. Then, the operator sees the displayed calculated positions on the monitor 7 and manually adjusts an image quality adjustment knob of the color display unit 1 to make image quality adjustments. Alternatively, the CPU 6' controls the color display unit 1 to automatically adjust the image qualities of the color display unit 1 depending on the calculated positions displayed on the monitor 7.

A process of measuring image distortions will be described below. The CPU 6' controls the signal generator 12 to display a raster on the full area of the effective display screen of the color display unit 1, and an edge position of the displayed raster is used as a reference position for the measurement of image distortions.

If the color display unit 1 comprises a display monitor (a color cathode-ray tube as a computer display monitor) and is set to an underscan mode, then the size of a raster displayed on the display screen in the underscan mode is smaller than the effective display screen of the color cathode-ray tube, and an edge position of the raster is not fixed and cannot be used as a reference position for the measurement of image distortions. In this case, an edge of the bezel of the cabinet of the display monitor, i.e., the color cathode-ray tube as a computer display monitor, needs to be used as a reference position for the measurement of image distortions. Therefore, an illuminating light source (not shown) is energized to illuminate the display screen of the display monitor for allowing the edge of the bezel to be positionally measured with ease. The display monitor, i.e., the color cathode-ray tube as a computer display monitor, can be controlled to switch between an overscan mode and an underscan mode.

A procedure to be carried out before the measurement of image distortions of the color display unit 1 which comprises a display monitor will be described below. If the apparatus is used in combination with a production line of color display units, then the input/output interface circuit 9 is employed. In such an application, a signal indicative of whether the color display unit 1 to be measured has reached a position in front of the color video camera 2 or a control signal for moving the color display unit 1 after its image qualities have been adjusted needs to be transmitted between the apparatus and a conveyor control system of the production line. Such a signal or control signal is transmitted through a parallel input/output circuit (not shown) in the input/output interface circuit 9.

(a) When the color display unit 1 to be measured has been moved by the conveyor of the production line and reached the position in front of the color video camera 2, the conveyor control system transmits a measurement start signal through the parallel input/output circuit in the input/output interface circuit 9 to the CPU 6'.

(b) Then, before the color display unit 1 displays a raster, the CPU 6' controls the input/output interface circuit 9 to energize the illuminating light source.

(c) The illuminating light source illuminates the display screen of the color display unit 1 for allowing the color video camera 2 to clearly image an edge of the bezel of the cabinet of the color display unit 1. The data of the imaged edge of the bezel is stored in the memory of the CPU 6' for subsequent calculations of reference position data for the measurement of image distortions.

(d) Thereafter, the CPU 6' controls the input/output interface circuit 9 to de-energize the illuminating light source. The CPU 6' then controls the signal generator 12 to display a measurement pattern on the display screen of the color display unit 1, and starts measuring image distortions.

In the measurement of image distortions, only a green signal produced by the color video camera 2 is used because the human visual sensitivity is highest with respect to the color of green among the three primaries, so that the color video camera 2 can provide the same measurement capability as a monochromatic video camera.

Then, for positioning the color display unit 1 and the color video camera 2 relatively to each other, the image signal from the color video camera 2 is supplied through the image processing circuit 5 to the CPU 6' and stored in a main memory thereof. The image signal stored in the main memory is periodically updated by the program run by the CPU 6'. The image signal stored in the main memory is sampled and reduced in size by the program run by the CPU 6'. The reduced image data is transferred to a memory area in a monitor display memory (video RAM) (not shown) of the CPU 6', and displayed in a predetermined image display area 7A*a* (see FIG. 4A) on the monitor 7.

Figure 4A:
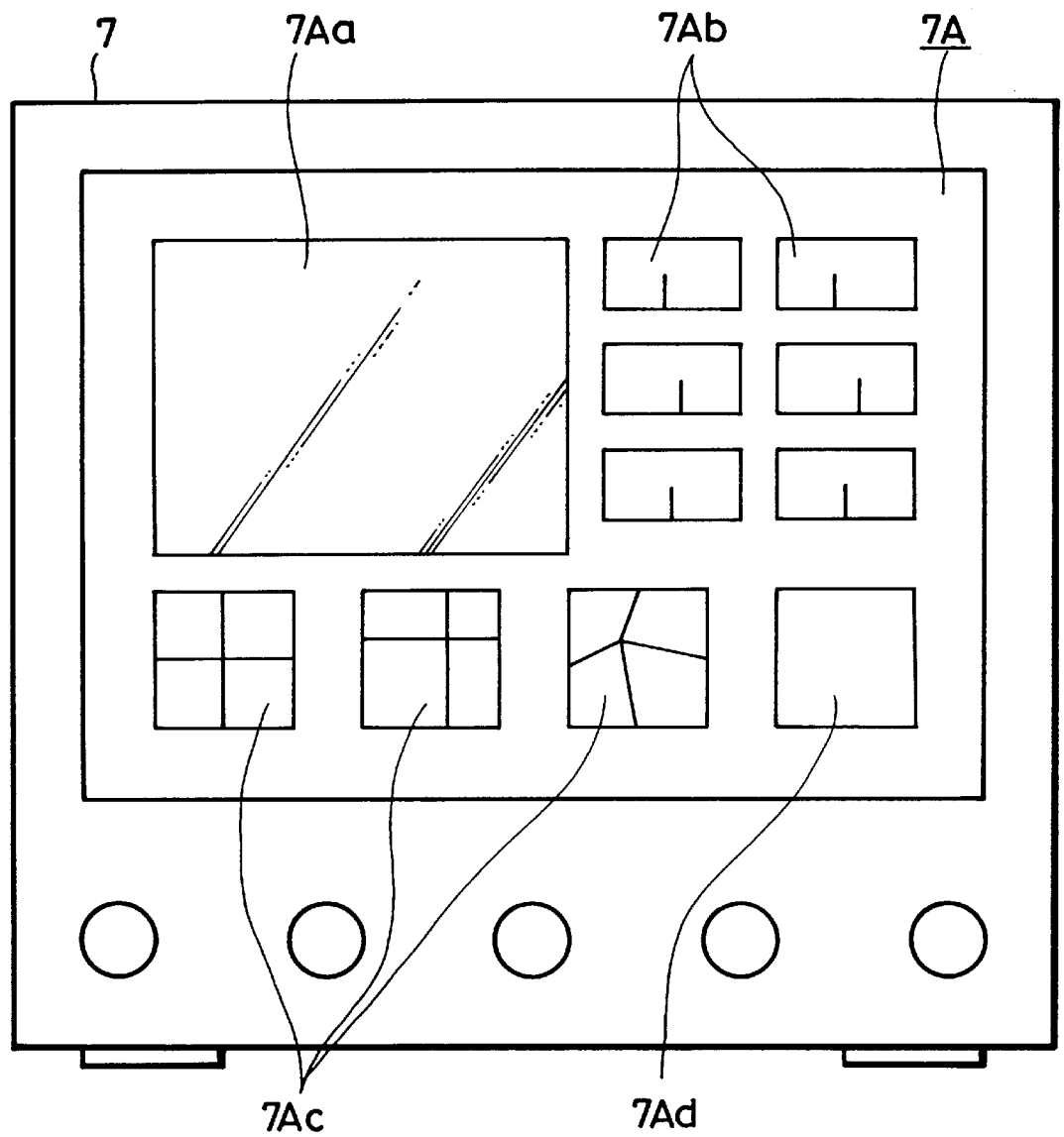
FIGS. 4A through 4D are front elevational views of display areas on a display screen of a monitor of the apparatus shown in FIG. 3.
Figures 4B, 4C, 4D:
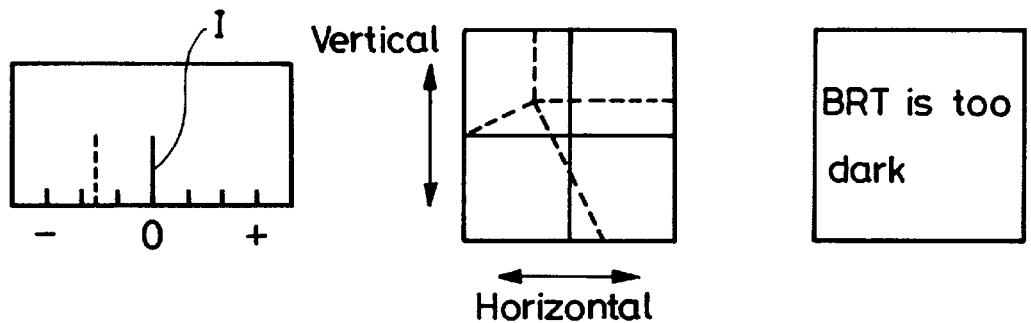
Figure 5A:
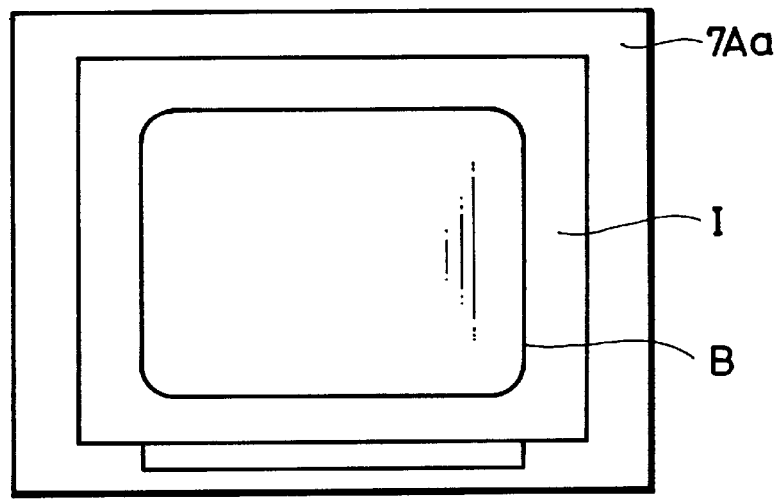
FIGS. 5A through 5C are front elevational views showing images displayed on the display screen of the monitor.

Various display areas on the display screen of the monitor 7 connected to the CPU 6' will be described below with reference to FIGS. 4A through 4D. In FIG. 4A, the display screen of the monitor 7 displays a screen image 7A which has a rectangular image display area 7A*a* which displays a front image of the color display unit 1 as shown in FIG. 5A. While seeing the front image of the color display unit 1 which is being displayed in the image display area 7A*a*, the operator adjusts the relative position of the color video camera 2 with respect to the color display unit 1. After the positional adjustment, the image display area 7A*a* is used to display a graphic pattern indicative of image qualities as determined by the CPU 6' or to display messages.

As shown in FIG. 4A, the display screen of the monitor 7 has six rectangular meter display areas 7A*b*. As shown in FIG. 4B, each of the rectangular meter display areas 7A*b* displays gradations on a lower horizontal side of the rectangular frame and a vertical indicator I movable horizontally along the gradations. One of the rectangular meter display areas 7A*b* indicates the brightness of the color display unit 1, for example.

As shown in FIG. 4A, the screen image 7A displayed on the display screen of the monitor 7 has three rectangular cross display areas 7A*c* below the image display areas 7A*a*, 7A*b*. As shown in FIG. 4C, each of the rectangular cross display areas 7A*c* displays four straight lines extending from respective sides of the rectangular frame and crossing together at a point which is movable horizontally and vertically depending on the image qualities of the color display unit 1. The central position of the display screen of the color display unit 1 is represented by two-dimensional, i.e., vertical and horizontal, elements (vertical and horizontal centers), and displayed in each of the rectangular cross display areas 7Ac.

The displayed state of the screen image 7A on the display screen of the monitor 7 is established by the program run by the CPU 6'.

As shown in FIG. 4A, the screen image 7A on the display screen of the monitor 7 also includes a rectangular message display area 7Ad. As shown in FIG. 4D, the message display area 7Ad displays messages in the form of English sentences, for example. The message shown in FIG. 4D is read "Brightness is too dark."

FIG. 5A shows a display mode in which the front image I of the color display monitor 1 is displayed in the image display area 7Aa of the monitor 7.

Figure 5B:
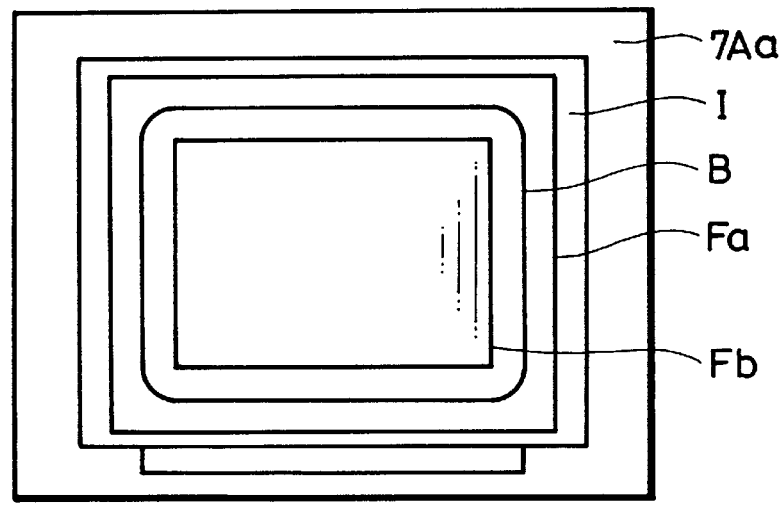

FIG. 5B shows another display mode in which the front image I of the color display monitor 1 and also outer and inner rectangular reference frames Fa, Fb are displayed in the image display area 7Aa of the monitor 7. In this display mode, the operator adjusts the relative positional relationship between the color display unit 1 and the color video camera 2, e.g., adjusts the position of the color video camera 2 with respect to the color display unit 1, such that a substantially rectangular bezel edge frame B of the front image I of the color display monitor 1 displayed in the image display area 7Aa will be positioned between the outer and inner rectangular reference frames Fa, Fb. The outer and inner rectangular reference frames Fa, Fb thus permit the operator to position the color video camera 2 with respect to the color display unit 1 easily, quickly, and accurately.

Figure 5C:
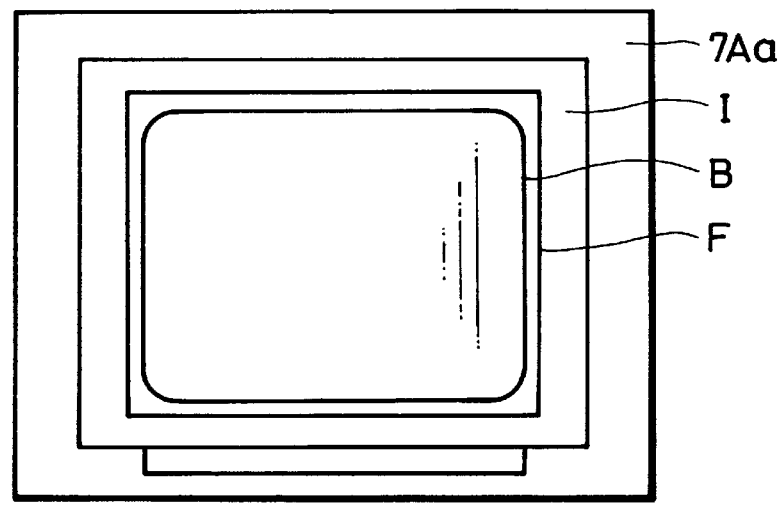

FIG. 5C shows still another display mode in which the front image I of the color display monitor 1 and also a rectangular reference frame F are displayed in the image display area 7Aa of the monitor 7. In this display mode, the operator adjusts the relative positional relationship between the color display unit 1 and the color video camera 2, e.g., adjusts the position of the color video camera 2 with respect to the color display unit 1, such that a substantially rectangular bezel edge frame B of the front image I of the color display monitor 1 displayed in the image display area 7Aa will be positioned as closely to the rectangular reference frame F as possible. The rectangular reference frame F thus permits the operator to position the color video camera 2 with respect to the color display unit 1 easily, quickly, and accurately.

Having described preferred embodiments of the invention with reference to the accompanying drawings, it is to be understood that the invention is not limited to those precise embodiments and that various changes and modifications could be effected by one skilled in the art without departing from the spirit or scope of the invention as defined in the appended claims.

What is claimed is:

1. An apparatus for measuring image qualities of a color display unit, comprising:

a color video camera for imaging a display screen of a first color display unit;

a computer for measuring image qualities of the display screen of said first color display unit based on an image signal generated by said color video camera;

a second color display unit for displaying data of the image qualities measured by said computer; and image signal generating means controllable by said computer for generating an image signal required to measure the image qualities and supplying the image signal generated thereby to the first color display unit;

said computer comprising means for supplying the image signal generated by said color video camera to said second color display unit to display an image of the display screen of the first color display unit in a predetermined display area on a display screen of said second color display unit to facilitate relative positional adjustment between said first color display unit and said color video camera, said predetermined display area being less than a full screen area of said second color display unit's display screen wherein said second color display unit displays in said predetermined display area on the display screen thereof at least one reference frame with respect to the image of the display screen of the first color display unit to facilitate positional adjustment of the video camera with respect to the first color display unit by positioning of the image in the predetermined display area with respect to the at least one reference frame.

2. The apparatus according to claim 1, wherein said at least one reference frame is a single frame, and dimensioned within the predetermined area so as to attain proper positional adjustment of the color video camera with respect to the first color display unit when a perimeter of the image of the first color display unit displayed in the predetermined area is substantially aligned with the reference frame.

3. The apparatus according to claim 1, wherein said at least one reference frame comprises a first, inner reference frame and a second, outer reference frame, with each frame being dimensioned within the predetermined area so as to attain proper positional adjustment of the color video camera with respect to the first color display unit when a perimeter of the image of the first color display unit displayed in the predetermined area is in between the inner and outer reference frames.

4. The apparatus according to claim 1, wherein said image qualities measured by said computer are displayed in additional predetermined areas of said second color display unit's display screen.

5. The apparatus according to claim 4, wherein said measured image qualities include brightness which is displayed in one of said additional predetermined areas, and a central position of the display screen of the first color display unit, which is displayed in a second one of said additional predetermined areas.

6. The apparatus according to claim 4, wherein one of said additional predetermined areas is an area for displaying a message concerning at least one measured image quality.

7. The apparatus according to claim 4, wherein said second color display unit has a fixed scanning frequency.

8. A method of measuring image qualities of a color display unit, comprising:

imaging a display screen of a first color display unit with a color video camera;

measuring image qualities of the display screen of the first color display unit with a computer based on an image signal generated by said color video camera;

supplying an image signal required to measure the image qualities from an image signal generator controlled by said computer to the first color display unit;

supplying an image signal from said color video camera through said computer to a second color display unit to display an image of the display screen of the first color display unit in a predetermined display area on a display screen of said second color display unit to facilitate relative positional adjustment between said first color display unit and said color video camera, said predetermined display area being less than a full screen area of said second color display unit's display screen and displaying in said predetermined display area on the display screen of the second color display unit at least one reference frame with respect to the image of the display screen of the first color display unit to facilitate positional adjustment of the video camera with respect to the first color display unit by positioning of the image in the predetermined display area with respect to the at least one reference frame.

9. The method according to claim 3, wherein said at least one reference frame is a single frame, and dimensioned within the predetermined area so as to attain proper positional adjustment of the color video camera with respect to the first color display unit when a perimeter of the image of the first color display unit displayed in the predetermined area is substantially aligned with the reference frame.

10. The method according to claim 3, wherein said at least one reference frame comprises a first, inner reference frame and a second, outer reference frame, with each frame being dimensioned within the predetermined area so as to attain proper positional adjustment of the color video camera with respect to the first color display unit when a perimeter of the image of the first color display unit displayed in the predetermined area is in between the inner and outer reference frames.

11. The method according to claim 8, further comprising displaying said measured image qualities in additional predetermined areas of said second color display unit's display screen.

12. The method according to claim 11, wherein said measured image qualities include brightness, which is displayed in one of said additional predetermined areas, and a measured central position of the display screen of the first color display unit, which is displayed in a second one of said additional predetermined areas.

13. The method according to claim 11, further comprising displaying a message concerning at least one measured image quality in one of said additional predetermined areas is an area for displaying a message.

14. The method according to claim 11, wherein said second color display unit has a fixed scanning frequency.

* * * * *